United States Patent
Zhao et al.

(10) Patent No.: US 7,586,923 B2
(45) Date of Patent: Sep. 8, 2009

(54) BANDWIDTH ALLOCATION FOR VOIP TRAFFIC IN NETWORK HAVING INTERFACE BETWEEN FRAME RELAY AND ATM

(75) Inventors: Yongdong Zhao, Pleasanton, CA (US); Shih-Chung Soon, Dublin, CA (US); Wengo Chen, Austin, TX (US); Teong Yee Tan, Pleasanton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 903 days.

(21) Appl. No.: 11/057,857

(22) Filed: Feb. 14, 2005

(65) Prior Publication Data

US 2006/0182024 A1    Aug. 17, 2006

(51) Int. Cl.
*H04L 12/56* (2006.01)
*H04J 3/22* (2006.01)

(52) U.S. Cl. .............................. 370/395.52; 370/395.6; 370/466

(58) Field of Classification Search ................. 370/229, 370/230, 230.1, 236, 352, 356, 395.1, 395.4, 370/395.41, 395.52, 395.6, 395, 61, 465–467, 370/395.63
See application file for complete search history.

(56) References Cited

U.S. PATENT DOCUMENTS

| | | | |
|---|---|---|---|
| 6,385,195 B2 | 5/2002 | Sicher et al. | |
| 6,389,130 B1 * | 5/2002 | Shenoda et al. | 379/221.08 |
| 6,657,963 B1 * | 12/2003 | Paquette et al. | 370/236 |
| 6,687,360 B2 | 2/2004 | Kung et al. | |
| 6,690,675 B1 | 2/2004 | Kung et al. | |
| 6,741,569 B1 | 5/2004 | Clark | |
| 6,778,555 B1 | 8/2004 | Chung | |
| 6,865,150 B1 * | 3/2005 | Perkins et al. | 370/230 |
| 6,917,610 B1 | 7/2005 | Kung et al. | |
| 7,251,216 B2 | 7/2007 | Dube et al. | |
| 2004/0213210 A1 * | 10/2004 | Dube et al. | 370/352 |
| 2005/0015253 A1 | 1/2005 | Rambo et al. | |

* cited by examiner

*Primary Examiner*—Wing F Chan
*Assistant Examiner*—Saba Tsegaye
(74) *Attorney, Agent, or Firm*—Toler Law Group

(57) ABSTRACT

A frame relay data rate $R_{FR}$ for a VoIP call is determined based on a particular packetization time interval $T_S$ and its associated sample data size $B_S$ for a particular CODEC, a size $B_{HT}$ of at least one of a frame relay header and a frame relay trailer, and a size $B_{IP}$ of an IP header. A number of VoIP calls $NUM_{VOIP}$ that can be supported by a frame relay access link is determined based on a bandwidth of the frame relay access link that is to be allocated to VoIP traffic, and the frame relay data rate $R_{FR}$. At least one network parameter is determined based on $NUM_{VOIP}$. Bandwidth in an asynchronous transfer mode (ATM) network is allocated for the VoIP traffic based on the at least one network parameter.

20 Claims, 2 Drawing Sheets

BANDWIDTH ALLOCATION FOR VOIP TRAFFIC IN NETWORK HAVING INTERFACE BETWEEN FRAME RELAY AND ATM

FIELD OF THE DISCLOSURE

The present disclosure relates to methods and systems for allocating bandwidth for Voice over Internet Protocol (VoIP) traffic.

DESCRIPTION OF THE RELATED ART

VoIP imposes stringent Quality of Service (QoS) constraints on network delay, jitter and packet loss. For example, a mouth-to-ear delay is not to exceed 150 ms, an end-to-end jitter is limited to be less than 30 ms, and a packet loss ratio is not to be more than 0.5%. To achieve the QoS, appropriate network resources including bandwidth are allocated to support the VoIP application.

In various VoIP applications, up to eight different VoIP coder-decoders (CODECs) may be employed. The different CODECs have different raw bit rates, ranging from 5.6 kbps to 64 kbps. TABLE I shows the raw bit rates of eight commonly used VoIP CODECs.

TABLE I

| CODEC | Bit Rate (kbps) |
| --- | --- |
| G.711 | 64 |
| G.723ar53 | 5.3 |
| G.723ar63 | 6.3 |
| G.726r16 | 16 |
| G.726r24 | 24 |
| G.726r32 | 32 |
| G.728 | 16 |
| G.729 | 8 |

The different CODECs have different packetization intervals, ranging from 10 ms to 100 ms. Consequently, the network bandwidth required for different combinations of CODEC and packetization delay can drastically vary. For example, on layer 3, the bandwidth required by a VoIP call is at least 16 kbps and at most 96 kbps.

The bandwidth allocation is more complicated when both asynchronous transfer mode (ATM) and frame relay networks are involved to transport the VoIP traffic end-to-end. This is because ATM and frame relay introduce different overheads for the same VoIP traffic, which in turn can cause bandwidth mismatch at an ATM/frame relay internetworking interface.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Disclosed herein is an ATM bandwidth allocation algorithm that more accurately matches ATM bandwidth to frame relay bandwidth for VoIP traffic. In an exemplary embodiment, the algorithm addresses bandwidth-mismatch-caused VoIP packet drop at an ATM/frame relay internetworking interface. Further, frame relay network bandwidth can be more fully utilized by allocating bandwidth using the algorithm. For instance, with the disclosed method, customers can send VoIP traffic at a rate of about 95% or higher of the frame relay access bandwidth. Since the signaling protocol of VoIP consumes a small portion of the frame relay bandwidth, the disclosed method is capable of reserving enough bandwidth for the signaling traffic. The disclosed method can be used by a telecommunications company to develop a network provisioning template to improve its provisioning process. The disclosed method can also be used to communicate with customers of the telecommunications company, helping them understand the cost and network resources required to support their services. For example, an agreement between the telecommunications company and its VoIP customer can include a condition that the customer cannot unilaterally alter its VoIP CODEC and its packetization interval without asking the telecommunications company to change the customer's ATM bandwidth.

To allocate ATM bandwidth to VoIP traffic, a number of VoIP calls that can be supported by a frame relay access link is determined. Using the herein-disclosed algorithm, the number of VoIP calls is determined based on total frame relay access bandwidth and an amount of frame relay bandwidth required for each call. ATM traffic parameters are determined based on the calculated number of VoIP calls and an estimated bandwidth for VoIP signaling and other protocol traffic. In contrast, other algorithms calculate the number of VoIP calls based on layer-3 bandwidth per call and total layer-3 bandwidth available in the network.

Figure 1:
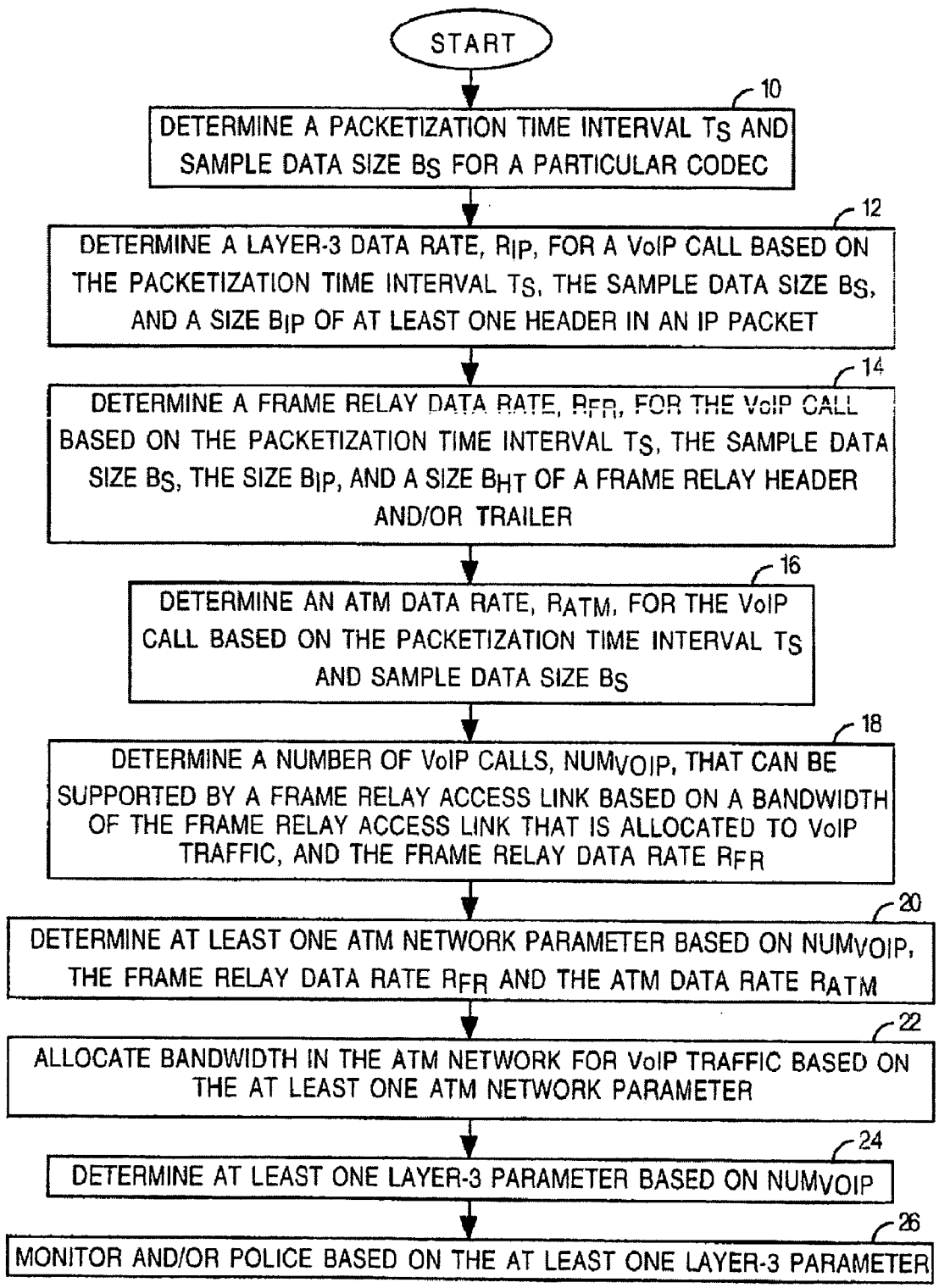
FIG. 1 is a flow chart of an embodiment of a method of allocating bandwidth.

FIG. 1 is a flow chart of an embodiment of a method of allocating bandwidth. As indicated by block 10, the method comprises determining a packetization time interval $T_S$ and sample data size $B_S$ for a particular CODEC. For instance, a G.711 CODEC has four different possible time intervals (10 ms, 20 ms, 30 ms and 40 ms). The sample data size is dependent on the packet time interval. TABLE II shows the sample data size $B_S$ (in bytes) as a function of the packetization time interval $T_S$ (in ms) for a G711 CODEC. For other CODEC standards, the sample data size $B_S$ can be determined based on the packetization time interval $T_S$ by referring to the standards specifications.

TABLE II

| Packetization Time (ms) | Sample Size (bytes) |
| --- | --- |
| 10 | 80 |
| 20 | 160 |
| 30 | 240 |
| 40 | 320 |

Figure 2:
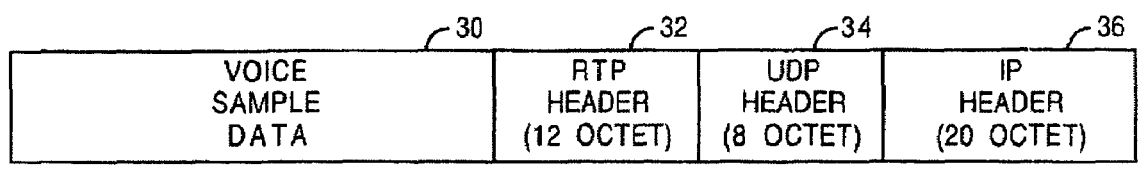
FIG. 2 is a block diagram of an embodiment of an IP packet that encapsulates a VoIP sample.

As indicated by block 12, the method comprises determining a layer-3 data rate for a VoIP call based on the sample data size $B_S$ and the packetization time interval $T_S$. The layer-3 data rate is higher than the CODEC raw data rate due to at least one header in each IP packet. FIG. 2 is a block diagram of an embodiment of an IP packet that encapsulates a VoIP sample. The IP packet comprises voice sample data 30, a real-time protocol (RTP) header 32, a user datagram protocol (UDP) header 34, and an Internet protocol (IP) header 36. The combined size of the RTP header 32, the UDP header 34 and the IP header 36 is 40-bytes in this embodiment. Therefore, in this embodiment, the layer-3 data rate $R_{IP}$ can be determined using the following equation.

$$R_{IP}=8*(40+B_S)/T_S \qquad (1)$$

If an alternatively-sized header(s) are used, the "40" in equation (1) is replaced by an alternative combined size $B_{IP}$ of at least one header in the IP packet, which results in $R_{IP}=8*(B_{IP}+B_S)/T_S$.

As indicated by block 14, the method comprises determining a frame relay data rate for the VoIP call based on the sample data size $B_S$ and the packetization time interval $T_S$. Since frame relay adds its own header and trailer to a VoIP IP packet, the frame relay data rate is also based on the size of the frame relay header and/or trailer, herein denoted by $B_{HT}$ in units of bytes. The frame relay data rate $R_{FR}$ can be determined using the following equation:

$$R_{FR}=8*(B_{HT}+B_{IP}+B_S)/T_S \qquad (2)$$

where $B_{IP}=40$ in one embodiment.

As indicated by block 16, the method comprises determining an ATM data rate $R_{ATM}$ for the VoIP call based on the sample data size $B_S$ (in bytes) and the packetization time interval $T_S$ (in ms). The particular equation used to determine the ATM data rate $R_{ATM}$ depends on the type of encapsulation used. If sub-network access protocol (SNAP) encapsulation is used, the ATM data rate $R_{ATM}$ is based on a number of cells $NUM_{CELL}$ determined using the following equation:

$$NUM_{CELL}=\text{ceiling}[(16+40+B_S)/48] \qquad (3)$$

where ceiling[n] represents the closest integer that is not smaller than n. If virtual-circuit-based multiplexing (Vcmux) encapsulation is used, the ATM data rate $R_{ATM}$ is based on a number of ATM cells $NUM_{CELL}$ determined using the following equation:

$$NUM_{CELL}=\text{ceiling}[(8+40+B_S)/48] \qquad (4)$$

The ATM data rate $R_{ATM}$ (in units of kbps if $T_S$ is in ms) is determined using the following equation.

$$R_{ATM}=NUM_{CELL}*53*8/TS \qquad (5)$$

As indicated by block 18, the method comprises determining a number of VoIP calls, $NUM_{VOIP}$, that can be supported by a frame relay access link. $NUM_{VOIP}$ is determined based on a bandwidth of the frame relay access link that is allocated to VoIP traffic, and the frame relay data rate $R_{FR}$.

The bandwidth of the frame relay access link is denoted by $B_{FR}$. Since some of the bandwidth is to be reserved for VoIP signaling protocol and other routing protocols, only a fraction $R_P$ of the frame relay bandwidth $B_{FR}$ can be allocated to VoIP data traffic. $R_P$ may be predetermined as 95% in one instance, but other percentage values are also within the scope of this disclosure.

In one embodiment, $NUM_{VOIP}$ is determined using the following equation:

$$NUM_{VOIP}=\text{floor}[R_P*B_{FR}/R_{FR}], \qquad (6)$$

wherein floor[ ] rounds a number down to its nearest integer.

As indicated by block 20, the method comprises determining one or more ATM bandwidth parameters based on $NUM_{VOIP}$, the frame relay data rate $R_{FR}$ and the ATM data rate $R_{ATM}$. The parameters may include a peak cell rate (PCR), a sustained cell rate (SCR), and a maximum burst size (MBS).

The SCR can be determined based on $NUM_{VOIP}$ using the following equation.

$$SCR=NUM_{VOIP}*R_{ATM}+(B_{FR}-NUM_{VOIP}*R_{FR})*53/48 \qquad (7)$$

It is noted that in other embodiments, the constant 53/48 in the above equation may be replaced with another constant.

The MBS can be determined based on a product of $NUM_{VOIP}$ and $NUM_{CELL}$ using the following equation.

$$MBS=NUM_{VOIP}*NUM_{CELL} \qquad (8)$$

The PCR can be set to any number allowed by the network. For instance, the PCR can be set to be equal to SCR.

As indicated by block 22, the method comprises allocating bandwidth in an ATM network for VoIP traffic based on the one or more ATM network parameters. This act may comprise outputting values of the one or more ATM network parameters in a machine-readable form to another device responsible for allocating the bandwidth in the ATM network for VoIP traffic. Alternatively, this act may comprise outputting the values of the one or more ATM network parameters in a human-readable form (e.g. on a hard copy or by an electronic display such as a computer display), wherein an operator reads the values and allocates the bandwidth in the ATM network.

As indicated by block 24, the method optionally comprises determining one or more layer-3 policing parameters based on the number of VoIP calls that can be supported by the frame relay access link, $NUM_{VOIP}$. The layer-3 policing parameters may include a committed information rate (CIR) and a committed burst size (Bc). The CIR can be determined using the following equation.

$$CIR=NUM_{VOIP}*R_{IP} \qquad (9)$$

The Bc can be determined using the following equation.

$$Bc=NUM_{VOIP}*(B_S+40) \qquad (10)$$

As indicated by block 26, the method optionally comprises monitoring and/or policing a portion of the network based on the one or more layer-3 parameters.

For purposes of illustration and example, the aforementioned equations are used to determine ATM bandwidth and layer-3 policing parameters for a CODEC G.711 with 20 ms packetization interval. For the packetization interval of $T_S$=20 ms, $B_S$=160 bytes in this CODEC standard. The IP data rate is:

$$R_{IP}=(40+160)*8/(20\text{ ms})=80\text{ kbps}.$$

On a T1 frame relay access link, 7 bytes of frame relay header/trailers are added to each VoIP IP packet. Therefore, the frame relay data rate is:

$$R_{FR}=(7+200)*8/(20\text{ ms})=82.8\text{ kbps}.$$

The total number of ATM cells is:

$$NUM_{CELL}=\text{ceiling}[(16+200)/48]=5\text{ cells}.$$

The ATM data rate for the VoIP call is:

$$R_{ATM}=5*53*8/(20\text{ ms})=106\text{ kbps}.$$

The ATM traffic parameters are:

$$SCR=17*106\text{ kbps}+(1536-17*82.8\text{ kbps})*53/48=1943.7\text{ kbps, and}$$

$$MBS=17*(5\text{ cells})=85\text{ cells}.$$

The layer-3 policing parameters are:

$$CIR=17*80\text{ kbps}=1360\text{ kbps, and}$$

$$Bc=17*(160\text{ bytes}+40\text{ bytes})=3400\text{ bytes}.$$

Figure 3:
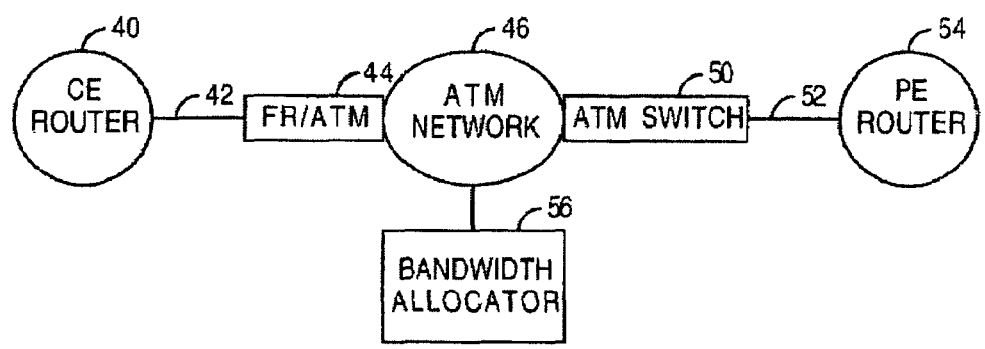
FIG. 3 is a block diagram of an embodiment of a network having a bandwidth allocator that performs the method of FIG. 1.

FIG. 3 is a block diagram of an embodiment of a network having a bandwidth allocator that performs the method of FIG. 1. From a customer edge (CE) router 40, one or more customers use frame relay to access the network. A frame relay access link 42, such as a permanent virtual circuit (PVC), communicates frame relay traffic between the CE router 40 and an FR/ATM internetworking interface 44. The FR/ATM internetworking interface 44 converts between frame relay traffic and ATM traffic. The FR/ATM internetworking interface 44 may be located at an ATM end switch.

The ATM traffic is communicated via an ATM network 46 between the FR/ATM internetworking interface 44 and an ATM switch 50. The ATM network 46 is the backbone of the network. The ATM switch 50 may comprise an ATM edge switch. An ATM access link 52, such as an ATM PVC, communicates ATM traffic between the ATM switch 50 and a provider edge (PE) router 54.

Thus, in one embodiment, the frame relay connection starts from a user's CE router 40 and ends at the ATM end switch (having the FR/ATM internetworking interface 44), and the ATM connection starts from the ATM end switch and ends at the PE router 54.

User VoIP traffic is encapsulated in a frame relay packet and sent to the ATM end switch (having the FR/ATM internetworking interface 44). The VoIP frame relay packet is de-capsulated by the FR/ATM internetworking interface 44, and converted to ATM cells that are sent to the ATM network 46. The PE router 54 receives the ATM cells, reconstructs the VoIP packet based on the ATM cells, and delivers the VoIP packets to a user on its end.

To mitigate bandwidth mismatch at the FR/ATM internetworking interface, a bandwidth allocator 56 allocates bandwidth in the ATM network 46 for VoIP traffic. If the ATM bandwidth were set too low, bandwidth in the frame relay access link 42 would be wasted. If the ATM bandwidth were set too high, VoIP traffic would be dropped at the FR/ATM internetworking interface 44 and cause service quality degradation. To avoid these conditions, the bandwidth allocator 56 performs the method described with reference to FIG. 1 to determine the one or more ATM network parameters, and to allocate ATM bandwidth to the VoIP traffic based on the parameter(s). The herein-disclosed calculation of ATM bandwidth more accurately estimates the actual ATM bandwidth used for VoIP traffic, and allows up to 95% or more of the frame relay access bandwidth to be used for VoIP traffic.

The bandwidth allocator 56 can be implemented by a computer system having at least one computer processor. Acts performed by the at least one computer processor are directed by a computer-readable medium having computer-readable program code stored therein.

It will be apparent to those skilled in the art that the disclosed embodiments may be modified in numerous ways and may assume many embodiments other than the forms specifically set out and described herein. For example, the acts described with reference to FIG. 1 can be performed in a different order than that depicted in FIG. 1 without affecting their results.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

determining a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call;

determining a number of VoIP calls $NUM_{VOIP}$ that can be supported by a frame relay access link based on a bandwidth of the frame relay access link that is to be allocated to VoIP traffic and the frame relay data rate $R_{FR}$, wherein the bandwidth of the frame relay access link that is to be allocated to VoIP traffic is a product of a bandwidth $B_{RF}$ of the frame relay access link and a predetermned fraction $R_P$ of the bandwidth of the frame relay access link that is to be allocated to VoIP traffic;

determining at least one network parameter based on $NUM_{VOIP}$; and allocating bandwidth in an asynchronous transfer mode (ATM) network for the VoIP traffic based on the at least one network parameter.

2. The method of claim 1 wherein the at least one network parameter comprises a maximum burst rate (MBS) based on $NUM_{VOIP}$.

3. The method of claim 1 further comprising:

determining at least one layer-3 parameter based on $NUM_{VOIP}$; and monitoring the VoIP traffic based on the at least one layer-3 parameter.

4. The method of claim 3 wherein the at least one layer-3 parameter comprises a committed information rate (CIR), the CIR based on a product of $NUM_{VOIP}$ and an Internet Protocol data rate $R_{IP}$ for the VoIP call.

5. The method of claim 3 wherein the at least one layer-3 parameter comprises a committed burst size (Bc), wherein Bc is proportional to $NUM_{VOIP}$.

6. The method of claim 1 wherein the size $B_{IP}$ of the at least one header in the IP packet for the VoIP call is a combined size of a real-time protocol (RTP) header, a user datagram protocol (UDP) header, and an IP header.

7. A computer-readable medium encoded with computer-readable program code to cause a computer system to:

determine a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call;

determine a number of VoIP calls $NUM_{VoIP}$ p that can be supported by a frame relay access link based on a bandwidth of the frame relay access link that is to be allocated to VoIP traffic and the frame relay data rate $R_{FR}$, wherein the bandwidth of the frame relay access link that is to be allocated to VoIP traffic is a product of a bandwidth $B_{FR}$ of the frame relay access link and a predetennined fraction $R_P$ of the bandwidth of the frame relay access link that is to be allocated to VoJIP traffic;

determine at least one network parameter based on $NUM-R_{VOIP}$; and allocate bandwidth in an asynchronous transfer mode (ATM) network for the VoIP traffic based on the at least one network parameter.

8. The computer-readable medium of claim 7 wherein the at least one network parameter comprises a maximum burst rate (MBS) based on $NUM_{VOIP}$.

9. The computer-readable medium of claim 7 wherein the computer-readable program code further causes the computer system to:
determine at least one layer-3 parameter based on $NUM_{VOIP}$; and
monitor the VoIP traffic based on the at least one layer-3 parameter.

10. The computer-readable medium of claim 9 wherein the at least one layer-3 parameter comprises a committed information rate (CIR), the CIR based on a product of $NUM_{VOIP}$ and an Internet Protocol data rate $R_{IP}$ for the VoIP call.

11. The computer-readable medium of claim 9 wherein the at least one layer-3 parameter comprises a committed burst size (Bc), wherein Bc is proportional to $NUM_{VOIP}$.

12. The computer-readable medium of claim 7 wherein the size $B_{IP}$ of the at least one header in the IP packet for the VoIP call is a combined size of a real-time protocol (RTP) header, a user datagram protocol (UDP) header, and an IP header.

13. A method comprising:
determining a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call;
determining a number of VoIP calls $NUM_{VoIP}$ that can be supported by a frame relay access link based on a bandwidth of the frame relay access link that is to be allocated to VoIP traffic and the frame relay data rate $R_{FR}$, wherein $NUM_{VoIP}=floor[R_p*B_{FR}/R_{FR}]$ and wherein $B_{FR}$ is a bandwidth of the frame relay access link and $R_p$ is a predetermined fraction of the bandwidth of the frame relay access link that is to be allocated to VoIP traffic;
determining at least one network parameter based on $NUM_{VoIP}$; and
allocating bandwidth in an asynchronous transfer mode (ATM) network for the VoIP traffic based on the at least one network parameter.

14. A method comprising:
determining a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call, wherein $R_{FR}$ is based on $(B_{HT}+B_{IP}+B_S)/T_S$;
determining a number of VoIP calls $NUM_{VOIP}$ that can be supported by a frame relay access link based on a bandwidth of the frame relay access link that is to be allocated to VoIP traffic and the frame relay data rate $R_{FR}$;
determining at least one network parameter based on $NUM_{VOIP}$; and
allocating bandwidth in an asynchronous transfer mode (ATM) network for the VoIP traffic based on the at least one network parameter.

15. A method comprising:
determining a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call;
determining a number of VoIP calls $NUM_{VOIP}$ that can be supported by a frame relay access link based on a bandwidth of the frame relay access link that is to be allocated to VoIP traffic and the frame relay data rate $R_{FR}$;
determining at least one network parameter comprising a sustained cell rate (SCR) based on $NUM_{VOIP}$ and an ATM data rate $R_{ATM}$ for the VoIP call, wherein $B_{FR}$ is a bandwidth of the frame relay access link, $SCR=NUM_{VOIP}*R_{ATM}+(B_{FR}-NUM_{VOIP}*R_{FR})*k$ and k is a constant; and
allocating bandwidth in an asynchronous transfer mode (ATM) network for the VoIP traffic based on the at least one network parameter.

16. The method of claim 15 wherein k=53/48.

17. A computer-readable medium encoded with computer-readable program code to cause a computer system to:
determine a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call;
determine a number of VoIP calls $NUM_{VOIP}$ that can be supported by a frame relay access link based on a bandwidth of the frame relay access link that is to be allocated to VoIP traffic and the frame relay data rate $R_{FR}$, wherein $NUM_{VOIP}=floor[R_p*B_{FR}/R_{FR}]$ and wherein $B_{FR}$ is a bandwidth of the frame relay access lilnk and $R_p$ is a predetermined fraction of the bandwidth of the frame relay access link that is to be allocated to VoIP traffic;
determine at least one network parameter based on $NUM_{VOIP}$; and
allocate bandwidth in an asynchronous transfer mode (ATM) network for the VoIP traffic based on the at least one network parameter.

18. A computer-readable medium encoded with computer-readable program code to cause a computer system to:
determine a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call, wherein $R_{FR}$ is based on $(B_{HT}+B_{IP}+B_S)/T_S$;
determine a number of VoIP calls $NUM_{VOIP}$ that can be supported by a frame relay access link based on a bandwidth of the frame relay access link that is to be allocated to VoIP traffic and the frame relay data rate $R_{FR}$;
determine at least one network parameter based on $NUM_{VOIP}$; and allocate bandwidth in an asynchronous transfer mode (ATM) network for the VoIP traffic based on the at least one network parameter.

19. A computer-readable medium encoded with computer-readable program code to cause a computer system to:
determine a frame relay data rate $R_{FR}$ for a Voice over Internet Protocol (VoIP) call based on a packetization time interval $T_S$ and its associated sample data size $B_S$ for a particular coder-decoder (CODEC), a size $B_{HT}$ of at least one of a frame relay header and a frame relay trailer, and a size $B_{IP}$ of at least one header in an IP packet for the VoIP call;

determine a number of VoIP calls $NUM_{VOIP}$ that can be supported by a frame relay access link based on a bandwidth of the frame relay access link that is to be allocated to VoIP traffic and the frame relay data rate $R_{FR}$;

determine at least one network parameter comprising a sustained cell rate (SCR) based on $NUM_{VOIP}$ and an ATM data rate $R_{ATM}$ for the VoIP call, wherein $B_{FR}$ is a bandwidth of the frame relay access link, $SCR = NUM_{VOIP} * R_{ATM} + (B_{FR} - NUM_{VOIP} * R_{FR}) * k$ and k is a constant; and allocate bandwidth in an asynchronous transfer mode (ATM) network for the VoIP traffic based on the at least one network parameter.

20. The computer-readable medium of claim 19 wherein k53/48.

* * * * *